Nov. 6, 1928.
G. CHANEY
1,690,966
WINDSHIELD FOR GRAIN HARVESTERS
Filed July 18, 1925
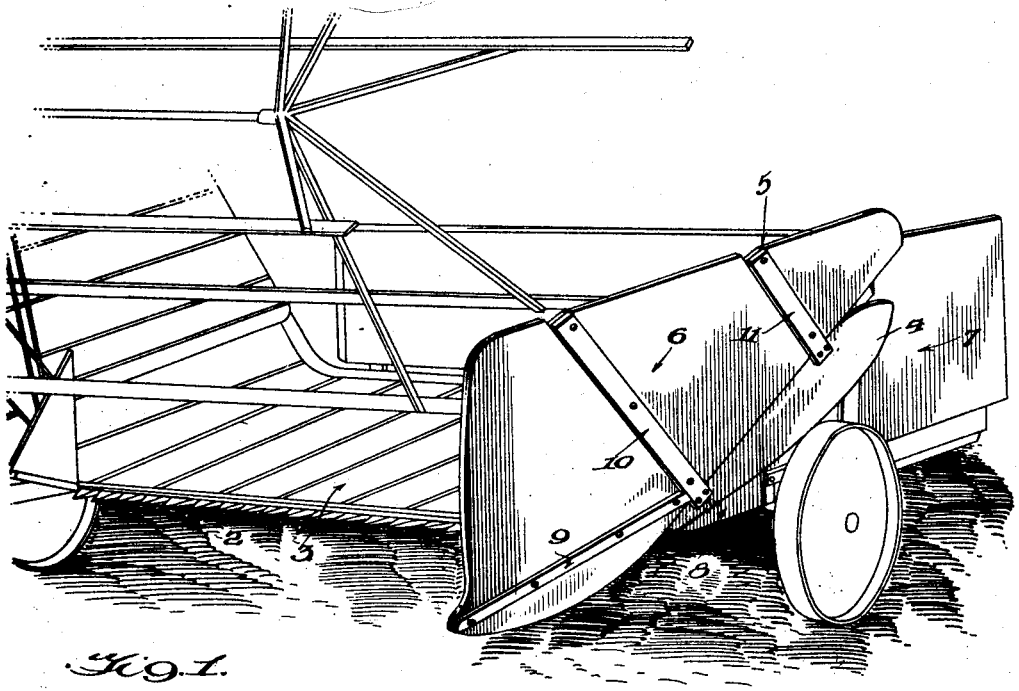
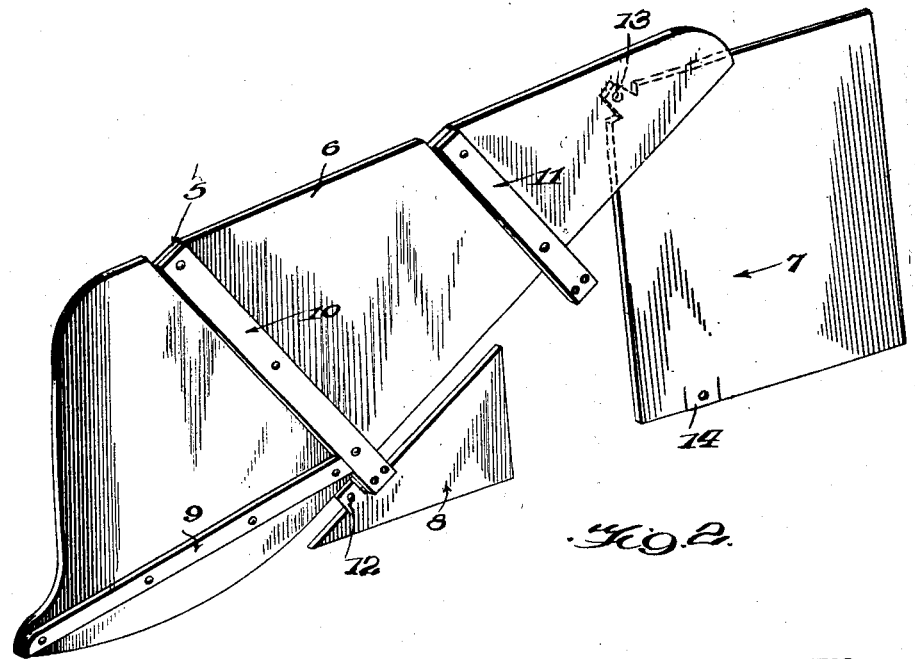

Patented Nov. 6, 1928.

1,690,966

UNITED STATES PATENT OFFICE.

GEORGE CHANEY, OF DONIPHAN, NEBRASKA.

WINDSHIELD FOR GRAIN HARVESTERS.

Application filed July 18, 1925. Serial No. 44,578.

This invention relates in general to grain harvesters, and more particularly to an improvement in windshields organized with a harvester in such a manner and so designed as to protect the grain that has been cut from the action of wind blowing across the harvester and tending to tangle and mix up the grain. The present invention permits the grain that has been cut to fall evenly and straight upon the canvas of the grain binder so that an even bundle will be bound, and much grain will be saved that would otherwise be lost.

A further object resides in the provision of a device of this character and having these advantages and capacities, which is of simple and durable construction, reliable and effective in operation, and easy and comparatively inexpensive to manufacture and apply.

Other objects and advantages reside in certain novel features of the construction, arrangement and combination of parts, which will be hereinafter more fully described and particularly pointed out in the appended claims, reference being had to the accompanying drawings forming a part of this specification, and in which:

Figure 1 is a perspective view showing the windshield constituting the present invention applied to a grain harvester and binder, and Figure 2 is a similar view showing the elements of the shield detached.

Referring to the drawings, the numeral 1 designates generally a grain harvester and binder which has the usual cutter bar 2, elevator 3, and dividing board 4.

The present invention proposes the provision of a windshield designated generally at 5 at the side of the harvester and binder, the windshield extending vertically above, also in advance of and in rear of the dividing board 4 and substantially in the same plane, and at right angles to the cutter bar. The windshield comprises three pieces of flat sheet metal designated at 6, 7 and 8, respectively. The piece 6 has its lower edge 6ª inclined upwardly and rearwardly to adapt it to fit on the upper edge of the ordinary divider board and has braces 9, 10 and 11 riveted or otherwise suitably secured thereto, and providing a convenient means whereby the piece 6 may be attached to the dividing board 4. The piece 8 which is substantially triangular has an apertured attaching lug 12 to facilitate its attachment to the dividing board by means of suitable fastening devices, and the rectangular piece 7 has apertured attaching lugs 13 and 14 for the same purpose. The piece 7 also will be engaged with the adjacent portion of the frame and so may the other pieces 6 and 8, where the engagement and fastening of such pieces to the frame is practical and convenient.

A windshield arranged at one side of the harvester and binder and mounted on the divider board and extending fore and aft of the machine, and at right angles to the cutter bar, is effective to shield the grain that has been cut from the action of the wind blowing across the machine. Wind blowing across the machine with the ordinary construction, will tangle and mix up the grain so that an uneven bundle will be formed and much grain will be lost. With the present invention, the wind cannot blow across the canvas or elevator, and the grain which has been cut will fall evenly and straight upon the canvas and will be bound in an even bundle. In this way, much grain heretofore lost will be saved.

I claim:—

1. In a grain harvester and binder having a cutter bar, an elevator and a dividing board, the combination of a windshield composed of a plurality of members, one of which is adapted to be mounted on and to extend in advance of the dividing board and at right angles to the cutter bar in a substantially vertical plane, and another member extending in rear of said dividing board and having means for connection therewith.

2. In a grain harvester and binder having a dividing board, the combination of a windshield having means for mounting it on the dividing board, said windshield extending above, and in front and in rear of said board.

3. In a grain harvester and binder having a dividing board, the combination of a windshield having means for mounting it on the dividing board, said windshield extending above, and in front and in rear of said board and consisting of three pieces of flat metal each having means for attachment to the dividing board to form in conjunction with the board a wind break for the machine.

4. A grain harvester and binder having a cutter bar, an elevator and the usual dividing board, a windshield mounted on and extending above said dividing board and comprising flat pieces shaped to fit upon the dividing board and to extend fore and aft thereof at one side and located at right angles to the cutter bar forming a connection with the dividing board, means to intercept the wind and prevent it from blowing the cut grain thus permitting it to fall evenly and straight upon the canvas of the machine.

GEORGE CHANEY.